United States Patent
Biswas et al.

(10) Patent No.: US 11,194,962 B2
(45) Date of Patent: Dec. 7, 2021

(54) AUTOMATED IDENTIFICATION AND CLASSIFICATION OF COMPLAINT-SPECIFIC USER INTERACTIONS USING A MULTILAYER NEURAL NETWORK

(71) Applicant: FMR LLC, Boston, MA (US)

(72) Inventors: Indraneel Biswas, Kolkata (IN); Nicholas Wilcox, Clayton, NC (US)

(73) Assignee: FMR LLC, Boston, MA (US)

( * ) Notice: Subject to any disclaimer, the term of this patent is extended or adjusted under 35 U.S.C. 154(b) by 163 days.

(21) Appl. No.: 16/432,872

(22) Filed: Jun. 5, 2019

(65) Prior Publication Data

US 2020/0387570 A1    Dec. 10, 2020

(51) Int. Cl.
| | | |
|---|---|---|
| G06F 40/205 | (2020.01) | |
| G06N 3/08 | (2006.01) | |
| G06N 3/04 | (2006.01) | |

(52) U.S. Cl.
CPC ............. *G06F 40/205* (2020.01); *G06N 3/04* (2013.01); *G06N 3/08* (2013.01)

(58) Field of Classification Search
CPC .......... G06F 40/205; G06N 3/04; G06N 3/08
USPC .......................................................... 704/9
See application file for complete search history.

(56) References Cited

U.S. PATENT DOCUMENTS

| | | | |
|---|---|---|---|
| 9,111,218 B1* | 8/2015 | Lewis | .................... G06Q 30/01 |
| 9,552,548 B1 | 1/2017 | Brestoff | |
| 10,397,272 B1* | 8/2019 | Bruss | .................... G06F 21/568 |
| 2008/0249764 A1* | 10/2008 | Huang | .................... G06F 40/30 |
| | | | 704/9 |
| 2013/0339457 A1 | 12/2013 | Freire et al. | |
| 2016/0147731 A1 | 5/2016 | Parikh et al. | |
| 2017/0193397 A1 | 7/2017 | Kottha et al. | |
| 2017/0308523 A1* | 10/2017 | Wang | .................... G06F 40/242 |
| 2019/0124020 A1* | 4/2019 | Bobbarjung | ......... G06Q 20/123 |
| 2020/0184307 A1* | 6/2020 | Lipka | .................... G06N 3/088 |

* cited by examiner

*Primary Examiner* — Pierre Louis Desir
*Assistant Examiner* — Nicole A K Schmieder
(74) *Attorney, Agent, or Firm* — Proskauer Rose LLP (57) ABSTRACT

Methods and apparatuses are described in which unstructured computer text is analyzed for identification and classification of complaint-specific user interactions. A data store receives unstructured computer text corresponding to current user interactions. A server filters the unstructured computer text to identify messages that comprise a potential complaint. For each message, the server: parses the message into sentences with words, converts each of the words in each sentence into a word vector, executes message classification models using the word vectors as input to generate a complaint probability value, combines the complaint probability values from each of the message classification models into an overall complaint probability value, classifies the message as a complaint when the overall complaint value exceeds a predetermined threshold value, and for each message classified as a complaint, routes the message to a client computing device that categorizes the message based upon one or more context features.

20 Claims, 7 Drawing Sheets

402 — 402a — `71821eb717f56d5ef6de78649dc52140` >> Not at the moment. No plans for any major changes. I do want to discuss some dissatisfaction with customer support, but heading out of town for a week. Back next Tuesday. Let's talk after that.

404 — `06264ca3cadaca13451981c43eee62b0` >> Please call me at (123)555-3105. This is unacceptable. I've tried to change my address for months and I keep getting the run around.

406 — `22fb86cb77273f1a0cbe994f49c68edab` >> ... ... ... Hi Joe, I hope you're well. Unfortunately, an updated 1099 for account ending in 0847 is not available. However, since the position has been updated (XYZ), please give these updated numbers to your CPA. OLD COST BASIS MARKET PRICE: 542.63 NEW COST BASIS MARKET PRICE: 130.67 Date Acquired: 11/22/15 This should be all that your CPA needs to update it on his or her end. Again, I apologize that a new 1099 has not been generated to reflect this change. If you have any questions, please give me a call. Regards, Bob ... ...

FIG. 7

AUTOMATED IDENTIFICATION AND CLASSIFICATION OF COMPLAINT-SPECIFIC USER INTERACTIONS USING A MULTILAYER NEURAL NETWORK

TECHNICAL FIELD

This application relates generally to methods and apparatuses, including computer program products, for automated identification and classification of complaint-specific user interactions using a multilayer neural network.

BACKGROUND

With the advent of computer-based communications, the concept of text can mean many different things, such as online surveys, feedback forms, chat dialog, social media interactions and conversations, and so forth. These types of unstructured computer text are present across all business domains in a variety of forms. In many instances, this type of unstructured computer text can include significant, time-sensitive communications—such as customer complaints. Sometimes, such complaints can invoke regulatory and/or compliance issues. Manual interpretation of such unstructured text to determine whether the text includes customer complaints is inefficient and time-consuming. Furthermore, such unstructured computer text often contains personal, sensitive or other confidential information of the user that submits the text, and organizations are typically restricted in how they must handle and protect this confidential information—for example, most (if not all) confidential information must be removed from unstructured computer text before the text can be analyzed for business intelligence and/or data mining purposes. In addition, existing computerized techniques for determining whether unstructured computer text involves customer complaints, such as AI-based text analysis, often fails to consider specific context and/or nuance of the underlying communication—and further cannot analyze a message in its broader context in order to determine a probability that a specific message is a complaint (e.g., based upon historical comparison).

Figure 1:
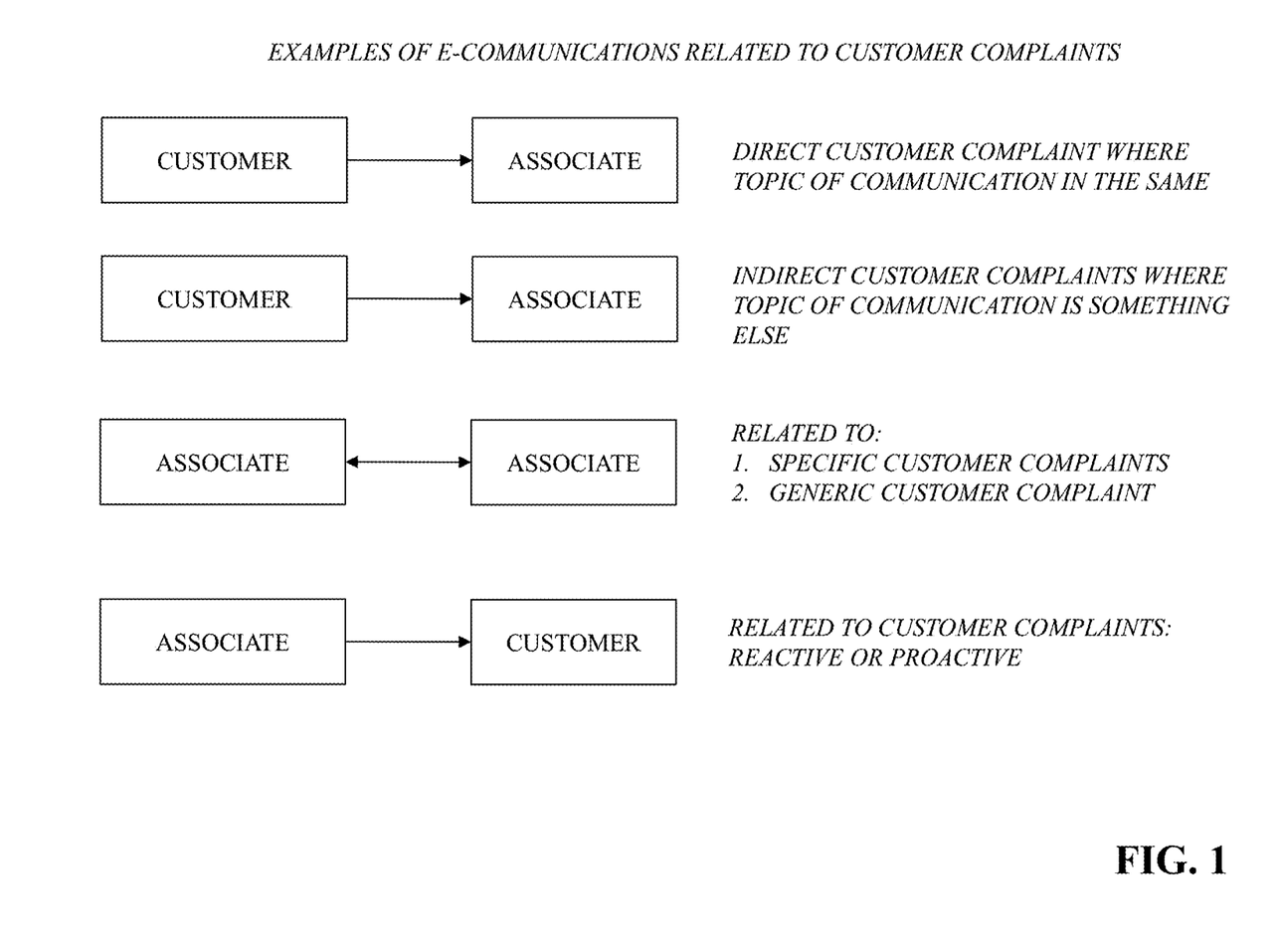
FIG. 1 is a diagram of exemplary e-communications related to customer complaints.

Furthermore, traditionally customer complaints have been associated with negative sentiment because it is assumed that any communication that contains a complaint will only originate from customers, who express the complaint with a negative sentiment. But that is not always the case. FIG. 1 provides exemplary e-communications that are related to customer complaints—such as direct customer complaints, indirect customer complaints, internal associate-to-associate communications relating to the complaints, and responsive/proactive communications from associate to customer. For example, associates within an organization discussing a customer's complaint may not have negative sentiment. Another example can be a hint of dissatisfaction in a customer conversation that is otherwise very positive (e.g., 'Your company has provided a good return on investment with a courteous demeanor, though your web services need work.'). Sarcasm in language can be yet another instance of a complaint without obvious negative sentiment. A team exchanging e-communication while solving a customer's complaint may not contain negative sentiment and the pattern of language may be very different than a complaint directly from the customer. An associate responding to a prior customer complaint may not have negative sentiment. All such communications, even communications that may or may not be a direct customer complaint but is related to a complaint, should be evaluated and addressed by a company, and existing systems that evaluate unstructured computer text have not been able to consider these communications.

SUMMARY

Therefore, what is needed are methods and systems for automatically identifying and classifying customer complaints embedded in a large corpus of unstructured computer text using advanced multilayer neural network techniques. The techniques described herein provide the technical advantage of generating highly-dimensionalized word vectors and tensors for each incoming message based upon specific features of the message and leveraging complex neural networks to vectorize, analyze and classify the message. Often, these complex neural networks are trained and inferred off-premises using cloud computing services. As discussed above, any breach in the cloud services can compromise data security, especially sensitive here due to the highly confidential nature of the communications. The present systems and methods leverage the vectorization of unstructured text data using word representation learning to advantageously encrypt the unstructured text data and prevent decryption without the proprietary vectorization model. As such, the present techniques enable vectorization on-premises and then moving the model to, e.g., a cloud computing framework for developing complex neural network model eliminates risk of exfiltration.

The invention, in one aspect, features a system used in a computing environment in which unstructured computer text is analyzed for identification and classification of complaint-specific user interactions. The system comprises a computer data store including a corpus of unstructured computer text comprising a plurality of messages corresponding to current user interactions, the unstructured computer text being input via an application running on a first client computing device, input directly into the computer data store via a first computer file, or any combination thereof. The system comprises a server computing device in communication with the computer data store, the server computing device comprising a memory to store computer-executable instructions and a processor that executes the computer-executable instructions. The server computing device filters the corpus of unstructured computer text using natural language processing to identify one or more messages of the plurality of messages that comprise a potential complaint. For each identified message, the server computing device: parses the message into a plurality of sentences with one or more words, converts each of the one or more words in each sentence into a word vector using a word embedding model, executes each of a plurality of message classification models using the word vectors from each sentence in the message as input to generate a complaint probability value for the message, each classification model comprising a multilayer neural network, combines the complaint probability values from each of the plurality of message classification models into an overall complaint probability value for the message, classifies the message as a complaint when the overall complaint value exceeds a predetermined threshold value, and for each identified message classified as a complaint, routes the identified message to a second client computing device, wherein the second client computing device categorizes the identified message based upon one or more context features of the message and stores the message in an archive.

The invention, in another aspect, features a computerized method in which unstructured computer text is analyzed for identification and classification of complaint-specific user interactions. A computer data store receives a corpus of unstructured computer text comprising a plurality of messages corresponding to current user interactions, the unstructured computer text being input via an application running on a first client computing device, input directly into the computer data store via a first computer file, or any combination thereof. A server computing device in communication with the computer data store filters the corpus of unstructured computer text using natural language processing to identify one or more messages of the plurality of messages that comprise a potential complaint. For each identified message, the server computing device: parses the message into a plurality of sentences with one or more words, converts each of the one or more words in each sentence into a word vector using a word embedding model, executes each of a plurality of message classification models using the word vectors from each sentence in the message as input to generate a complaint probability value for the message, each classification model comprising a multilayer neural network, combines the complaint probability values from each of the plurality of message classification models into an overall complaint probability value for the message, classifies the message as a complaint when the overall complaint value exceeds a predetermined threshold value, and for each identified message classified as a complaint, routes the identified message to a second client computing device, wherein the second client computing device categorizes the identified message based upon one or more context features of the message and stores the message in an archive.

Any of the above aspects can include one or more of the following features. In some embodiments, the server computing device receives a second corpus of unstructured computer text comprising a plurality of messages, the second corpus of unstructured computer text corresponding to prior user complaints. For each message in the second corpus of unstructured computer text, the server computing device: parses the message into a plurality of sentences with one or more words; converts each of the one or more words in each sentence into a word vector using a word embedding model; trains each of the plurality of message classification models, using the word vectors from each sentence in the message as input, to generate a complaint prediction value for the message; determines whether the complaint prediction value for the message classifies the message as a complaint; and adjusts one or more of the plurality of message classification models when the complaint prediction value for the message does not classify the message as a complaint.

In some embodiments, filtering the corpus of unstructured computer text using natural language processing comprises identifying one or more complaint-specific keywords; determining whether one or more of the complaint-specific keywords is located in the corpus of unstructured computer text; and capturing each message in the corpus of unstructured computer text that contains at least one of the complaint-specific keywords. In some embodiments, the server computing device parses the unstructured text into one or more sentences by locating a terminator in the unstructured computer text and separating the unstructured computer text on one side of the terminator into a sentence.

In some embodiments, the multilayer neural network comprises an encoder layer, a recurrent neural network layer, a self-attention layer, a feed forward layer, and an output layer. In some embodiments, combining the complaint probability values from each of the plurality of message classification models into an overall complaint probability value for the message comprises: receiving, by an ensemble classifier on the server computing device, the complaint probability value for the message from each of the plurality of message classification models; and aggregating, by the ensemble classifier, the complaint probability value from each of the plurality of message classification models to generate the overall complaint probability value for the message.

In some embodiments, each word vector comprises a plurality of numeric values corresponding to one or more of a context or a meaning of the word. In some embodiments, routing the identified message to a second client computing device comprises: capturing metadata associated with the identified message; assigning at least a portion of the metadata as the one or more context features of the identified message; identifying a destination address associated with the second client computing device based upon the one or more context features; and transmitting the identified message and the one or more context features to the second client computing device using the destination address. In some embodiments, the second client computing device selects the archive to store the identified message based upon the one or more context features. In some embodiments, the one or more messages comprise email messages. In some embodiments, the one or more context features comprises an origination address, a destination address, a date, a timestamp, a subject line, an email host address, and a policy value.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 2:
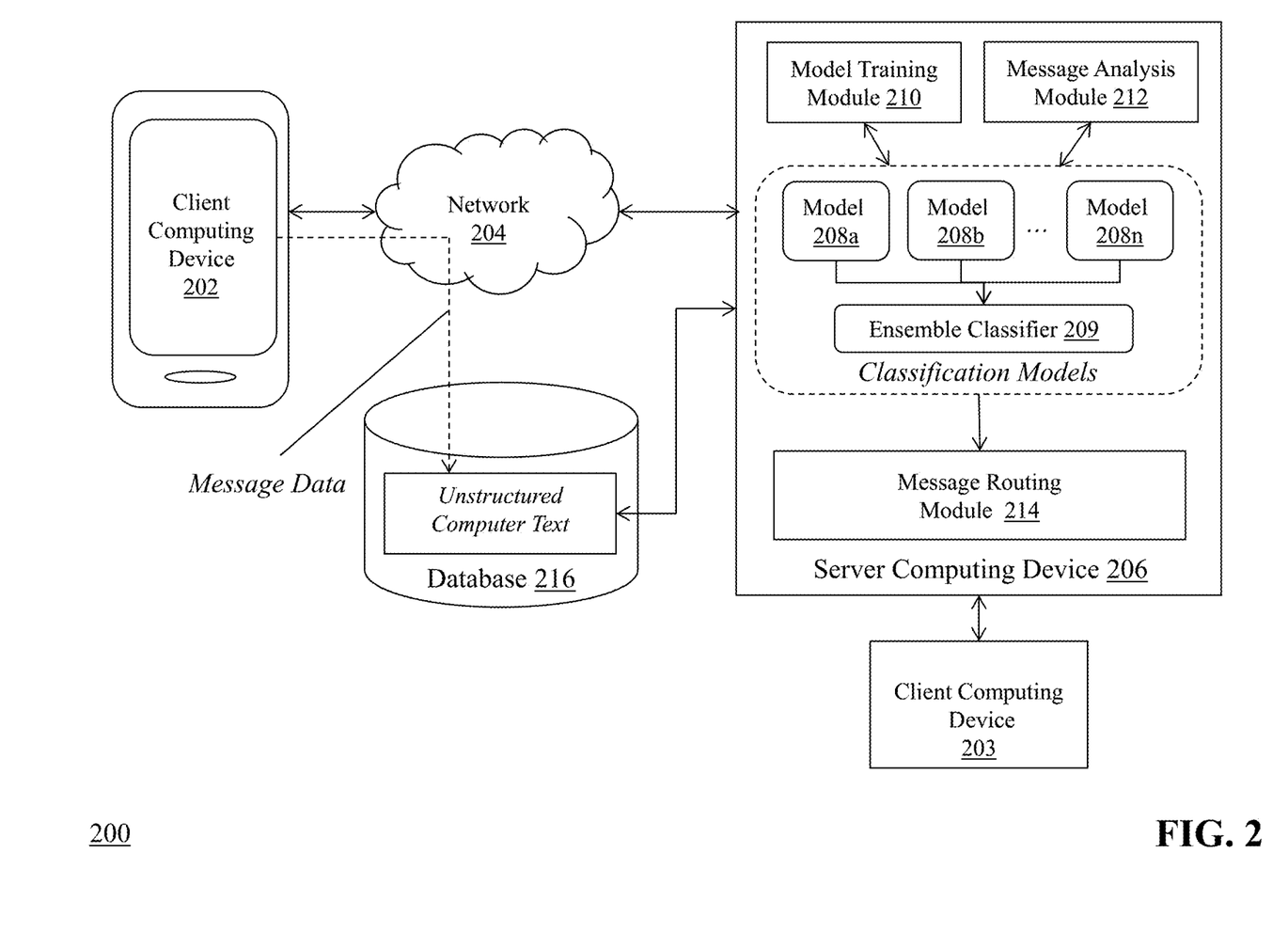
FIG. 2 is a block diagram of a system in which unstructured computer text is analyzed for automated identification and classification of complaint-specific user interactions using a multilayer neural network.

FIG. 2 is a block diagram of a system 200 in which unstructured computer text is analyzed for automated identification and classification of complaint-specific user interactions using a multilayer neural network. The system 200 includes a client computing device 202, a client computing device 203, a communications network 204, a server computing device 206 that includes a plurality of classification models 208a-208n, an ensemble classifier 209, a model training module 210, a message encoding module 212, and a message routing module 214, and a database 216 that includes unstructured computer text generated from message data received by the database from, e.g., client computing device 202.

The client computing device 202 connects to the communications network 204 in order to communicate with the server computing device 206 to provide input and receive output relating to the process of automated identification and classification of complaint-specific user interactions using a multilayer neural network as described herein. The client computing device 202 is coupled to a display device (not shown). For example, client computing device 202 can provide a graphical user interface (GUI) via the display device that is configured to receive input from a user of the device 202 and to present output to the user that results from the methods and systems described herein.

Exemplary client computing devices 202 include but are not limited to desktop computers, laptop computers, tablets, mobile devices, smartphones, and internet appliances. It should be appreciated that other types of computing devices that are capable of connecting to the components of the system 200 can be used without departing from the scope of invention. Although FIG. 2 depicts a single client computing device 202, it should be appreciated that the system 200 can include any number of client computing devices.

The client computing device 203 is a computing device coupled to the server computing device 206 and used to execute software applications in response to messages from the server computing device 206. In one example, the client computing device 203 is a workstation (e.g., desktop computer) of a system administrator (e.g., a compliance monitoring agent) that enables the system administrator to receive messages, access information and perform actions using software on the client computing device 203 based upon the message classification processing performed by the server computing device 206. The client computing device 203 is capable of executing locally-stored software applications and also capable of accessing software applications delivered from the server computing device 206 (or other computing devices) via a cloud-based or software-as-a-service paradigm.

The communications network 204 enables the client computing device 202 and, in some embodiments the client computing device 203, to communicate with the server computing device 206. The network 204 is typically a wide area network, such as the Internet and/or a cellular network. In some embodiments, the network 204 is comprised of several discrete networks and/or sub-networks (e.g., cellular to Internet).

The server computing device 206 a device including specialized hardware and/or software modules that execute on a processor and interact with memory modules of the server computing device 206, to receive data from other components of the system 200, transmit data to other components of the system 200, and perform functions for automated identification and classification of complaint-specific user interactions using a multilayer neural network as described herein. The server computing device 206 includes a plurality of artificial intelligence (AI) classification models 208a-208n, an ensemble classifier 209, a model training module 210, a message encoding module 212, and a message routing module 214 that execute on the processor of the server computing device 206. In some embodiments, the modules 210, 212, 214 are specialized sets of computer software instructions programmed onto one or more dedicated processors in the server computing device 206 and can include specifically-designated memory locations and/or registers for executing the specialized computer software instructions.

Although the classification models 208a-208n, the ensemble classifier 209, and the computing modules 210, 212, 214 are shown in FIG. 2 as executing within the same server computing device 206, in some embodiments the functionality of the models 208a-208n, the ensemble classifier 209, and the computing modules 210, 212, 214 can be distributed among a plurality of server computing devices. As shown in FIG. 2, the server computing device 206 enables the models 208a-208n, the ensemble classifier 209, modules 210, 212, 214 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the classification models 208a-208n, the ensemble classifier 209, and the computing modules 210, 212, 214 is described in detail below.

The database 216 is a computing device (or in some embodiments, a set of computing devices) coupled to the server computing device 206 and is configured to receive, generate, and store specific segments of data relating to the process of automated identification and classification of complaint-specific user interactions using a multilayer neural network as described herein. In some embodiments, all or a portion of the database 216 can be integrated with the server computing device 206 or be located on a separate computing device or devices. The database 216 can comprise one or more databases configured to store portions of data used by the other components of the system 200, as will be described in greater detail below. An exemplary database 216 is MySQL™ available from Oracle Corp. of Redwood City, Calif.

The database 216 includes unstructured computer text, which is a dedicated section of the database 216 that contains specialized data relating to message data received from, e.g., the client computing device 202, which is used by the other components of the system 200 to perform the process of automated identification and classification of complaint-specific user interactions using a multilayer neural network as described herein. Further detail on the unstructured computer text and message data is provided below.

Figure 3:
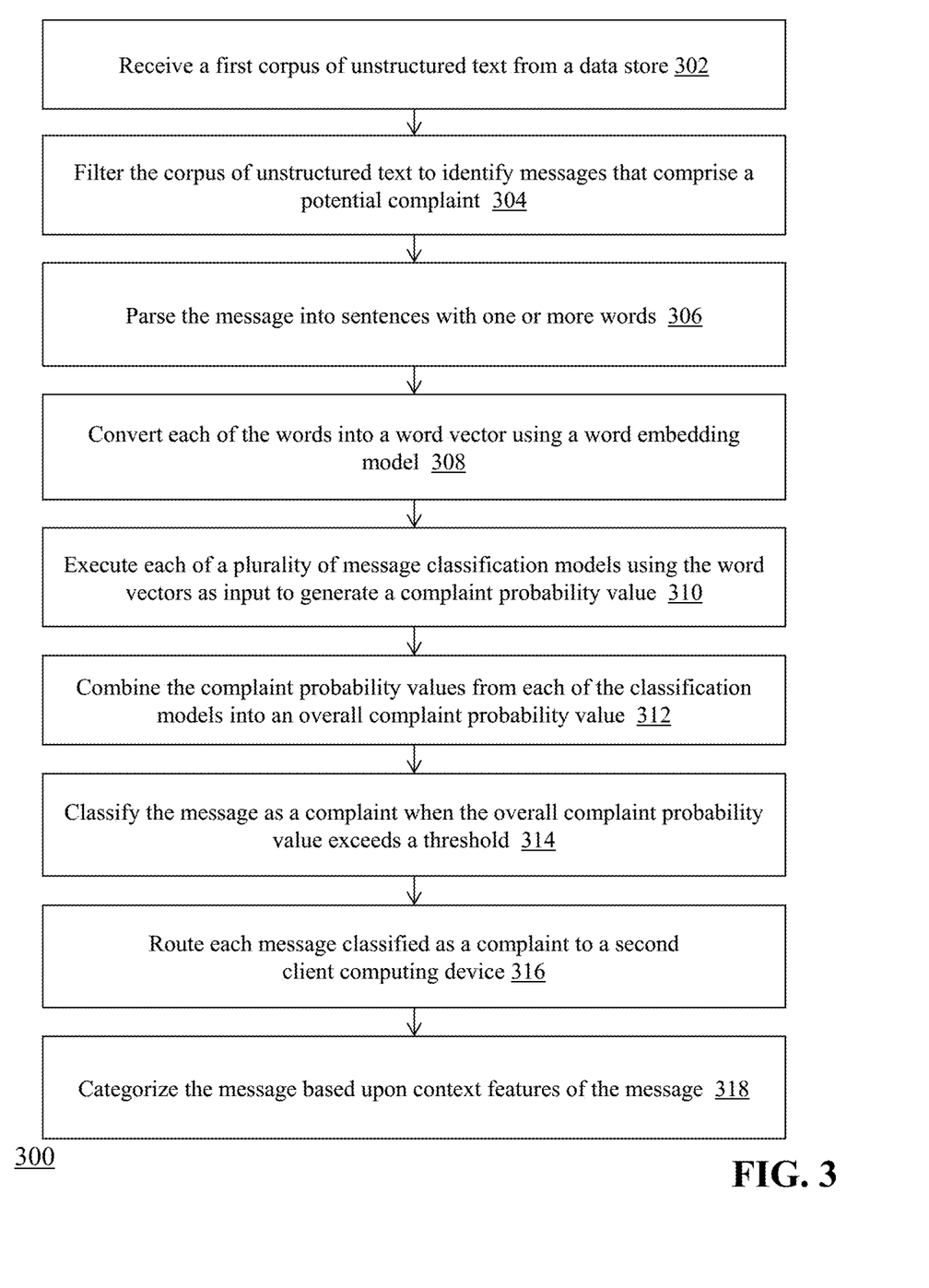
FIG. 3 is a flow diagram of a computerized method in which unstructured computer text is analyzed for automated identification and classification of complaint-specific user interactions using a multilayer neural network.

FIG. 3 is a flow diagram of a computerized method 300 in which unstructured computer text is analyzed for automated identification and classification of complaint-specific user interactions using a multilayer neural network, using the system 200 of FIG. 2. The server computing device 206 receives (302) a first corpus of unstructured computer text from the database 216. In some embodiments, the database 216 stores unstructured computer text that is input to the database 216 from one or more client computing devices (e.g., client device 202) in a number of different ways—such as via a web page, via a computer file, or a combination of both.

In one example, the unstructured computer text can comprise data derived from a variety of message-based sources, including but not limited to voice-to-text or chat log transcripts (e.g., of customer service calls/chat sessions), emails received from customers, customer service representative notes (e.g., entered by the representative into a terminal during a customer interaction), verbatims for survey responses or other similar types of feedback, and so forth. This message data is received by the database 216 and converted into unstructured computer text (e.g., by capturing the message text, formatting the message text from one format to another, filtering out irrelevant data such as certain characters, punctuation, message metadata, etc.). In some embodiments, the database 216 can retrieve the unstructured text from one or more repositories and/or computing systems (e.g., as a data feed and/or a file), such as customer relationship management systems, email servers, customer/employee feedback or survey systems, social media systems, human resources systems, and so forth.

Upon receiving the unstructured computer text generated from the message data, the message encoding module 212 filters (304) the first corpus of unstructured text using natural language processing (NLP) to identify messages that comprise a potential complaint. In some embodiments, the message encoding module 212 can use an NLP application programming interface, such as Google® Cloud™ Natural Language API available from Google, Inc. or Watson™ Natural Language Understanding from IBM Corp. to filter the corpus of unstructured computer text. To perform the filtering, the message encoding module 212 can, for example, scan the unstructured computer text for specific keywords (e.g., by using a keyword dictionary stored in the database 216) that are known to be associated with customer complaint interactions. In another example, the message encoding module 212 can compare one or more attributes of a message in the first corpus of unstructured computer text to one or more attributes of a historical message that was previously classified as a complaint and saved in database 216 to determine similarities between the attributes—e.g., syntax, language, sender, recipient, subject matter, word context, etc. It should be appreciated that other types of message filtering can be used within the scope of the technology described herein. The message encoding module 212 can determine a subset of the unstructured computer text that comprises messages pertaining to a potential complaint and capture those messages for further processing, while discarding or ignoring messages that do not pertain to a potential complaint.

Figure 4:
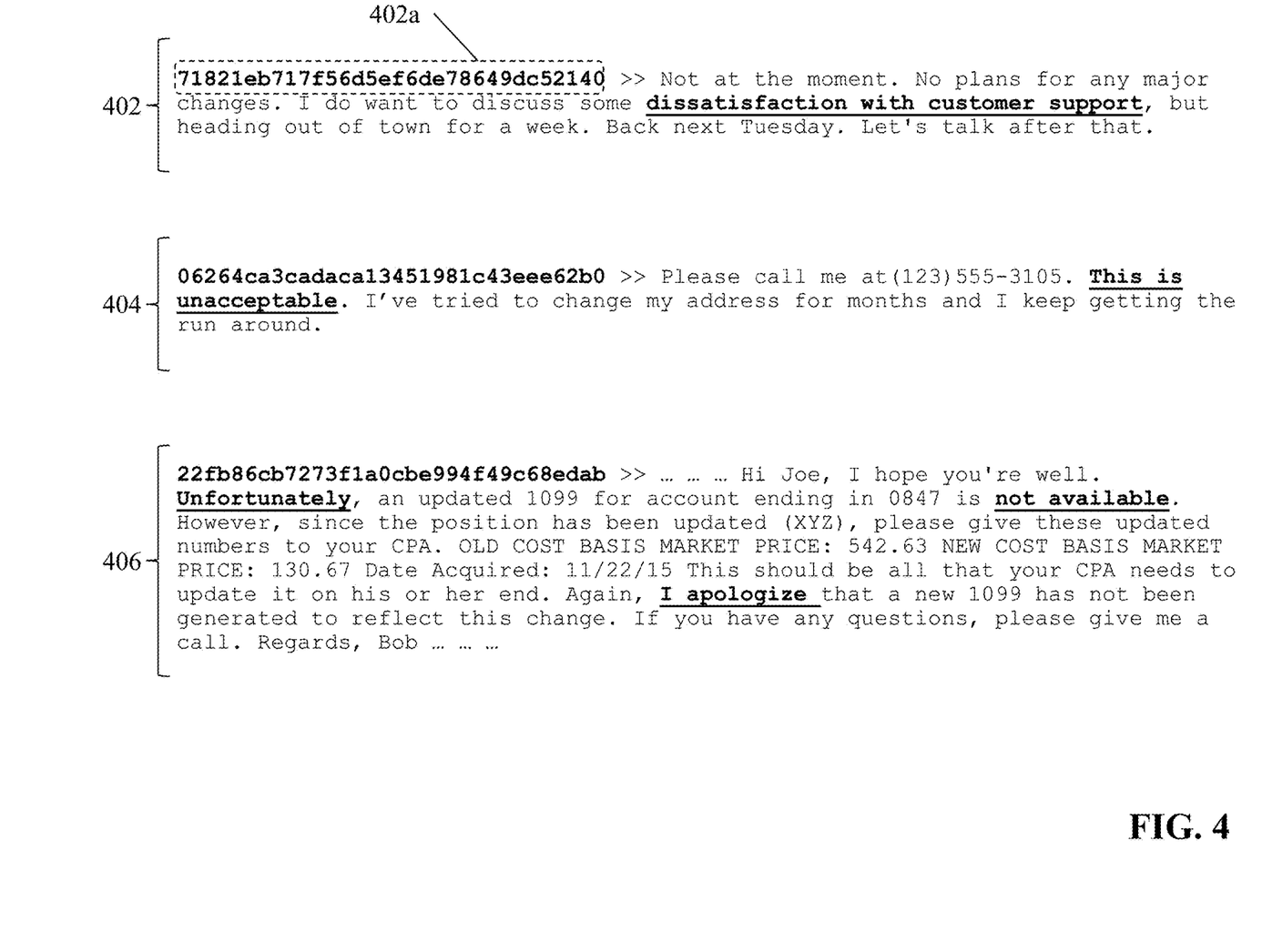
FIG. 4 is a diagram of several exemplary messages included in the first corpus of unstructured computer text.

FIG. 4 is a diagram of several exemplary messages 402, 404, 406 included in the first corpus of unstructured computer text. As shown in FIG. 4, each message includes a message identifier (e.g., identifier 402a) and text body. In some embodiments, the identifier 402a references a portion of database 216 that stores metadata relating to the message (e.g., origination address, sender name, destination address, recipient name, timestamp, subject line, email host address, and the like). The message 402 is from a customer and includes the phrase "dissatisfaction with customer support," and the message encoding module 212 can be configured to detect the phrase (and/or the word "dissatisfaction") and flag the corresponding message 402 as potentially including a complaint. Similarly, the message 404 is from another customer and includes the phrase "This is unacceptable," again potentially indicating a complaint to be analyzed further by the server computing device 206. In a different example, the message 406 is a response to a verbal customer complaint from a customer service representative (CSR) or other agent, and includes the phrases "unfortunately . . . not available" and "I apologize"—indicating to the message encoding module 212 that the message relates to a customer complaint.

Turning back to FIG. 3, once the message encoding module 212 has filtered the corpus of unstructured computer text to identify one or more messages that comprise a potential complaint, the message encoding module 212 parses (306) each of the messages into sentences with one or more words. For example, the message encoding module 212 can identify one or more delimiters in the message text that correspond to a separate sentence or phrase (e.g., a period) and parse the message text into different sentences, each comprising one or more words. In some embodiments, the words can be further tokenized and broken down to sub-words. Parts of speech, entity recognition, sentiment analysis and the like may also be included in some embodiments.

Figure 5:
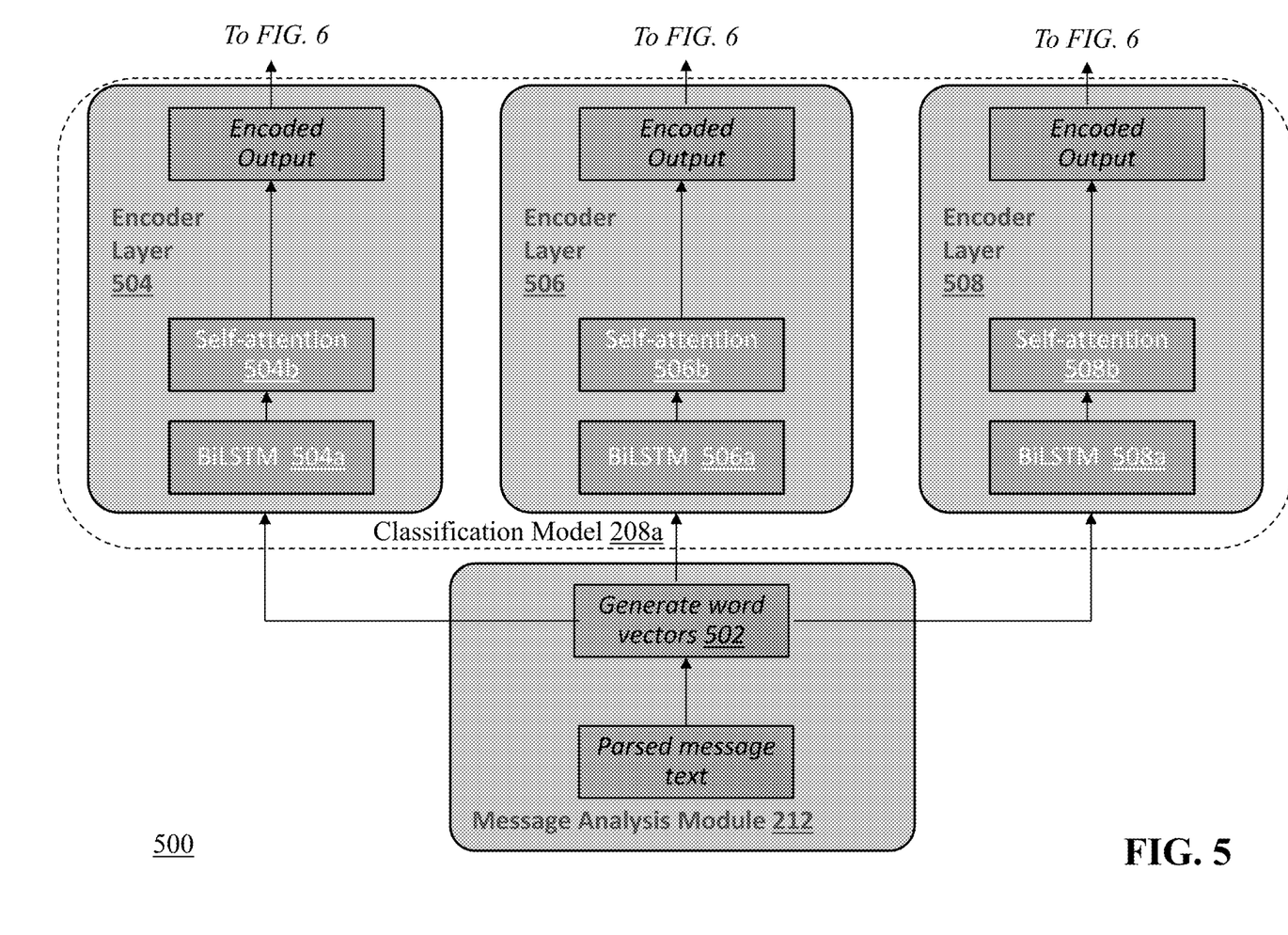
FIG. 5 is a detailed block diagram of the message encoding module and classification model with respect to converting the words in each sentence into a word vector.

The message analysis module 212 converts (308) each of the one or more words in each sentence that is received into a word vector using a word embedding model, and transmits the word vectors (or in some embodiments, tensors that comprise a plurality of word vectors) to a plurality of classification models 208a-208n, which are executed (310) by the server computing device 206 using the word vectors as input to generate a complaint probability value for the input word vectors. FIG. 5 is a detailed block diagram 500 of the message encoding module 212 and classification model 208a with respect to converting the words in each sentence into a word vector. It should be appreciated that a plurality of classification models 208a-208n can be executed by the server computing device 206 in parallel, and each classification model 208a-208n can perform the processing as described below. As shown in FIG. 5, the message analysis module 212 generates (502) word vectors for each word in the sentence using a trained word embedding model. Generally, the trained word embedding model is a neural network configured to receive text as input and generate a word embedding (i.e., a vector representation of a word) for one or more words in the text. Exemplary word embedding models used by the message analysis module 212 include, but are not limited to, fastText™ available from http://fasttext.cc, Word2vec (available from http://deeplearning4j.org/word2vec), Glove (available from http://nlp.stanford.edu/projects/glove).

The message encoding module 212 then transmits the word vectors from the one or more messages to a plurality of classification models 208a-208n executing on server computing device 206. Each classification model 208a-208n comprises a neural network with a plurality of layers that process and classify the message text using artificial intelligence techniques. In some embodiments, the plurality of classification models 208a-208n are each configured to process the incoming word vectors differently based upon a variety of considerations (e.g., word importance, context, weighting, etc.) in order to generate a different prediction (or complaint probability value) of whether the message comprises a customer complaint. As is explained in greater detail below, the complaint probability values from each of the classification models 208a-208n can be evaluated by the ensemble classifier 209 to determine an overall complaint probability value for the message. It should be appreciated that, while FIG. 2 depicts three classification models 208a-208n, the system 200 can comprise any of a number of classification models without departing from the scope of the technology described herein.

Once the model (e.g., model 208a) has received the word vectors, the model 208a uses the word vectors/tensors (i.e., concatentations of word vectors that make up each sentence) as input to a plurality of encoder layers 504, 506, 508. For example, the model 208*a* can distribute a single tensor from a message that comprises multiple tensors to a different encoder layer 504, 506, 508 (in order to achieve faster/more efficient processing, especially of large messages or large corpuses of text). Each encoder layer 504, 506, 508 comprises a bi-directional long short-term memory (BiLSTM) layer 504*a*, 506*a*, 508*a* of the neural network (e.g., LSTM, bi-LSTM, GRU, Attention layers, vanilla RNNs, time distributed neural networks, positional encoders, time distributed CNN, etc.) which refines the word vectors generated by the message analysis module 212. Generally, the BiLSTM layer 504*a*, 506*a*, 508*a* presents each word sequence in the tensor forwards and backwards to two separate hidden states to capture past and future information, respectively. Then the two hidden states are concatenated to form the final output. In general, an encoder layer encodes snippets of vectorized message to create a context specific tensor. Encoded tensors from each snippet are accumulated by another layer or multitude of layers to create another tensor representing the message. Yet another layer of multitude of layers interpret the message interpretation tensor to output the probability score. A multitude of such models are ensembled to infer the final score of the message.

In other embodiments of the classification model, transfer learning may be applied, where a per-learnt language model is used as encoder, and the ended tensor for the message is consumed by some layers to infer message probability/classification.

Each encoder layer 504, 506, 508 of the classification model 208*a* then uses the output from its BiLSTM layer 504*a*, 506*a*, 508*a* as input to a corresponding self-attention layer 504*b*, 506*b*, 508*b* in the encoder layer 504, 506, 508. The self-attention layer enables the model 208*a* to consider the context of each word vector as it relates to the surrounding words. Generally, the self-attention layer 504*b*, 506*b*, 508*b* maps a query and a set of key-value pairs to an output, where the query, keys, values, and output are all word vectors. The output is computed as a weighted sum of the values, where the weight assigned to each value is computed by a compatibility function of the query with the corresponding key. The self-attention layer uses the word vectors from the BiLSTM to determine relationships of each word in a sentence with the other words in the sentence to identify which other word(s) provide more, or the most, context to a given word—which enables the model 208*a* to predict whether the sentence (and thus, the message) is related to a customer complaint.

Figure 6:
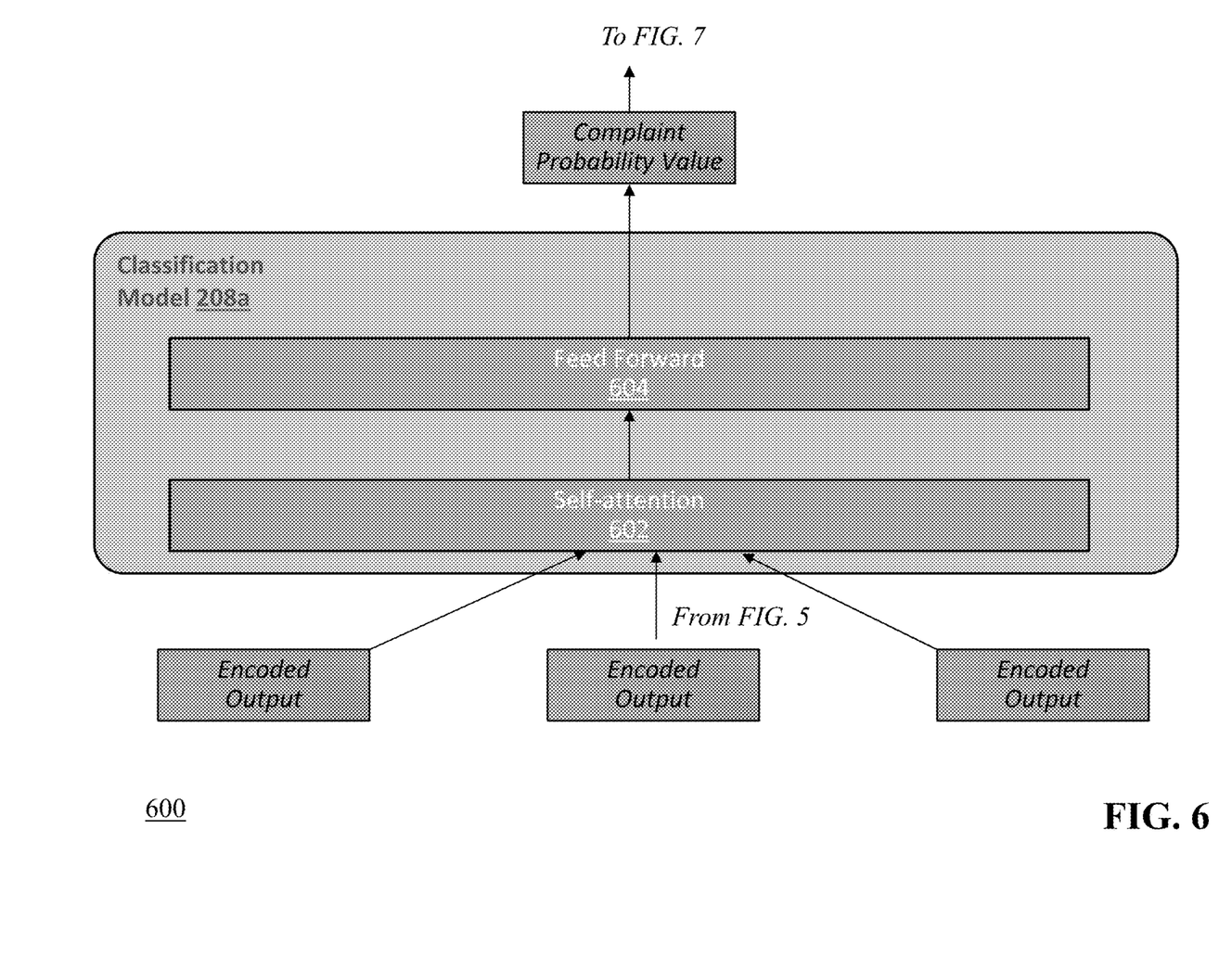
FIG. 6 is a detailed block diagram of the classification model with respect to generating a complaint probability value for at least a portion of each message.

After application of the self-attention layer 504*b*, 506*b*, 508*b*, the classification model 208*a* transmits the tensors to other layers of the neural network for additional processing, as described below. FIG. 6 is a detailed block diagram 600 of the classification model 208*a* with respect to generating a complaint probability value for at least a portion of each message (the same processing is applicable to classification models 208*b*, and 208*n*). The classification model 108*a* uses the encoded output from the self-attention layer 504*b*, 506*b*, 508*b* of FIG. 5 as input to another self-attention layer 602, which determines relationships of each tensor from a portion of a particular message (each tensor being received as encoded output from the respective self-attention layers 504*b*, 506*b*, 508*b* of FIG. 5) to other tensors in the same portion of the message to identify which other tensor(s) provide more, or the most, context to a given tensor—which enables the model 208*a* to predict whether the portion of the message is related to a customer complaint.

The classification model 208*a* then transmits the output from the self-attention layer 602 to a feed forward layer 604 of the neural network, which analyzes the tensors as encoded by the self-attention layer 602 to generate a complaint probability value for the message. The complaint probability value is a numeric representation of the likelihood that a given message contains or is in some way related to a customer complaint. In some embodiments, the complaint probability value is between 0 and 1. In some embodiments, the complaint probability value is expressed as a percentage between 0 and 100%. Each classification model 208*a*-208*n* generates a complaint probability value for a given message—as noted above, the specific configuration of each classification model 208*a*-208*n* can be different (e.g., due to algorithms, weightings, etc.) in order to emphasize different aspects of the message (e.g., context, word choice, metadata) and generate a different complaint probability value.

Figure 7:
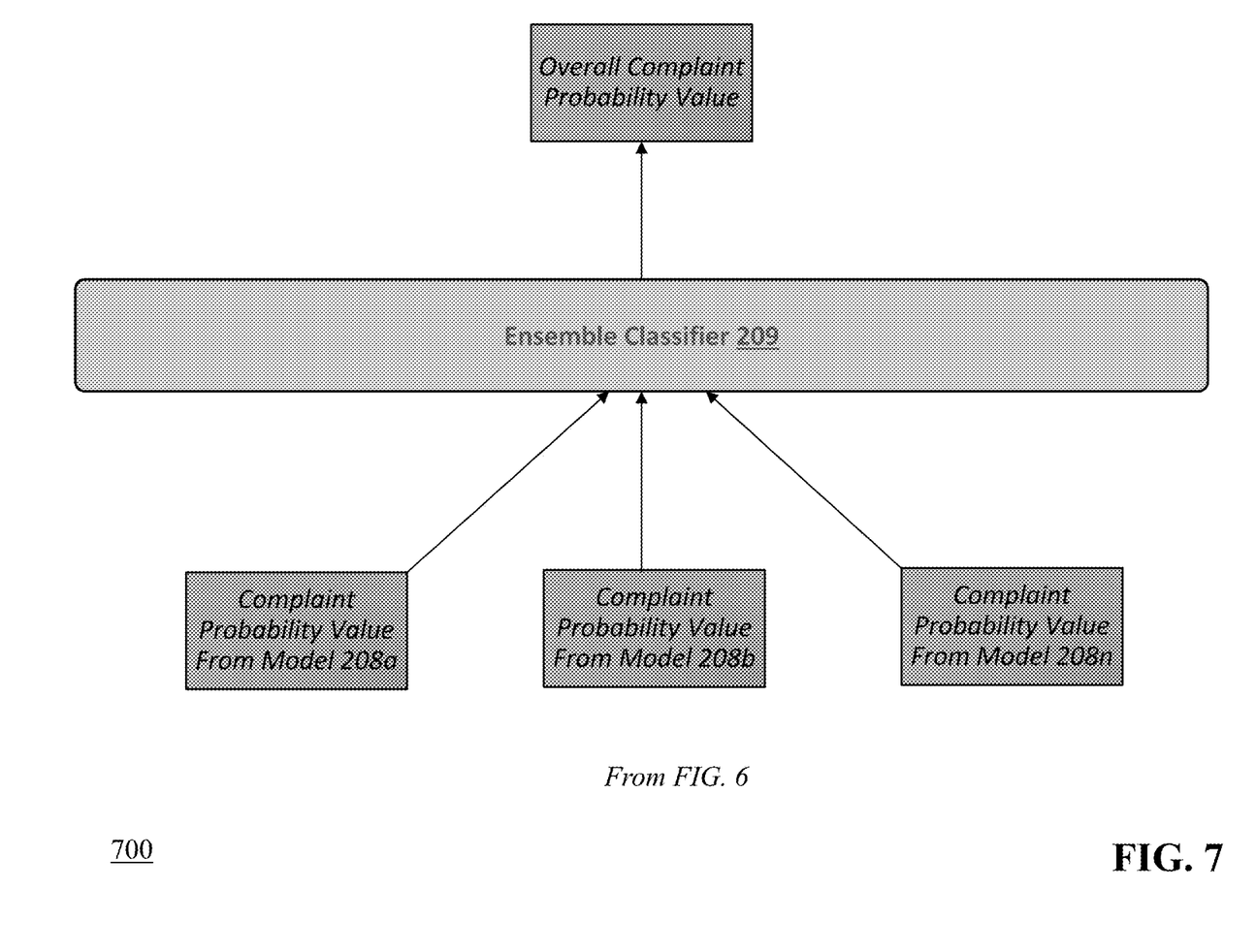
FIG. 7 is a block diagram of the ensemble classifier for generating an overall complaint probability value.

The complaint probability values from each of the classification models 208*a*-208*n* are transmitted to the ensemble classifier 209, as shown in FIG. 7. The ensemble classifier 209 combines (312) the complaint probability values from each of the classification models 208*a*-208*n* into an overall complaint probability value. For example, the ensemble classifier 209 can determine an error value associated with each of the classification models 208*a*-208*n* (i.e., how accurate the complaint probability value is with respect to a predetermined value or with an expected error value) and select the complaint probability value from the model that produced, e.g., the lowest error rate. In another example, the ensemble classifier 209 can aggregate the respective complaint probability values from each of the classification models 208*a*-208*n* using an algorithm (e.g., weightings, average value, etc.). It should be appreciated that other types of methodologies to determine the overall complaint probability value from the respective complaint probability values of the models 208*a*-208*n* can be used within the scope of the technology.

Once the overall complaint probability value is determined, the message routing module 214 can receive the overall value from the ensemble classifier 209 and classify (314) the message as a complaint when the overall complaint probability value exceeds a threshold. For example, when the overall complaint probability value exceeds 75% (meaning that it is relatively likely that the message relates to a customer complaint), the message routing module 214 can classify the message as a complaint (e.g., by adding a complaint flag to metadata of the message, by updating a field in database 216 that indicates the message is a complaint, by assigning the message to a particular message queue, etc.). Then, the message routing module 214 routes (316) each message classified as a complaint to a second client computing device (e.g. client computing device 203) for further analysis. For example, the message routing module 214 can manage a messaging queue that triggers routing of a message when the queue receives a message that has been classified as a complaint (e.g., by using the message metadata).

The client computing device 203 receives the messages classified as complaints from the server computing device 206, and the client device 203 categorizes (318) each message based upon one or more context features of the message and stores the message in an archive. The context features of the message can comprise, but are not limited to, an origination address (e.g., a sender email address or email domain), a destination address (a recipient email address or email domain), a date, a timestamp, a subject line, an email host address, and a policy value. At least a portion of the context features can be obtained from metadata associated with the message. The policy value can pertain to one or more compliance policies adopted or managed by an operator of server computing device 206 (i.e., the organization about which the complaint was received). For example, certain complaints may involve significant compliance risks, such as violation of governmental regulations. The client computing device 203 can categorize messages that relate to this type of complaints based upon the policy value.

The client computing device 203 further stores the messages in an archive once the messages are categories. This process can also be for compliance purposes, in order to preserve a record of each customer complaint for regulatory and customer service reasons. In some embodiments, the client computing device 203 selects an archive (e.g., in database 216) in which to store the categorized message based upon the one or more context features.

Another important aspect of the methods and systems described herein is the utilization of historical message data that comprises customer complaints, in order to train the classification models 208a-208n for improved accuracy and efficiency. The server computing device 206 includes a model training module 210 that can adjust the classification models 208a-208n based upon results of model execution on training data so that the models 208a-208n generate more accurate predictions of whether a previously-unanalyzed message relates to a customer complaint. During the training phase, the server computing device 206 performs much of the same processing as described above with respect to steps 302 through 314 of FIG. 3—except the server computing device 206 uses as input a second corpus of unstructured text (e.g., retrieved from database 216) that contains a plurality of messages which have already been classified (either through AI means or manual identification) as comprising customer complaints. Using this corpus of text, the model training module 210 can evaluate whether the classification models 208a-208n are accurately predicting whether a specific historical message is a customer complaint or not, and if necessary, adjust the weightings, algorithms, etc. embedded in the neural network of one or more of the models 208a-208n based upon the accuracy. In some embodiments, models 208a-208n are trained using data that is not common in its entirety. For example, only messages that are true complaints are common to all models. Sample messages that are not customer complaints are not common in their training sets. An aspect to this technique is that the model training module 210 uses the entire message to train the classification models, whereas traditionally, certain parts/sentences of the message that have the complaint are used for training. In this method of training, the model training module 210 figures out on its own which parts of the message deal with customer complaint, and which parts do not. Any optimization algorithm, such as Newton's method, or quasi-Newton methods, or first order methods or evolutionary algorithms, or variants thereof, can be used—but the present technology is not limited to these. In some embodiments, training is done in using a GPU or TPU environment, but in other embodiments, where time is not a constraint, training can also be performed in a CPU environment.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system used in a computing environment in which unstructured computer text is analyzed for identification and classification of complaint-specific user interactions, the system comprising:

a computer data store including a corpus of unstructured computer text comprising a plurality of messages corresponding to current user interactions, the unstructured computer text being input via an application running on a first client computing device, input directly into the computer data store via a first computer file, or any combination thereof, and a server computing device in communication with the computer data store, the server computing device comprising a memory to store computer-executable instructions and a processor that executes the computer-executable instructions to:

filter the corpus of unstructured computer text using natural language processing to identify one or more messages of the plurality of messages that comprise a potential complaint;

for each identified message:

parse the message into a plurality of sentences with one or more words;

convert each of the one or more words in each sentence into a word vector using a word embedding model;

execute each of a plurality of message classification models using the word vectors from each sentence in the message as input to generate a complaint probability value for the message, each message classification model comprising a multilayer neural network that is configured to have weight values different from the other message classification models according to a different aspect of the message, wherein the aspect of the message comprises one of message word choice, message context, or message metadata, and wherein each message classification model comprises:

a plurality of encoder layers, each encoder layer comprising a bi-directional long short-term memory layer and an encoder self-attention layer that processes a different portion of the word vectors from the message, a model self-attention layer that receives word vectors from each of the plurality of encoder layers to determine relationships of each word vector from a portion of the message to other word vectors in the portion of the message, and a feed forward layer that receives word vectors from the model self-attention layer to generate the complaint probability value for the message based upon the weight value assigned to the model;

combine the complaint probability values from each of the plurality of message classification models into an overall complaint probability value for the message;
classify the message as a complaint when the overall complaint value exceeds a predetermined threshold value; and
for each identified message classified as a complaint, route the identified message to a second client computing device, wherein the second client computing device categorizes the identified message based upon one or more context features of the message and stores the message in an archive.

2. The system of claim 1, wherein the server computing device:
receives a second corpus of unstructured computer text comprising a plurality of messages, the second corpus of unstructured computer text corresponding to prior user complaints;
for each message in the second corpus of unstructured computer text:
parses the message into a plurality of sentences with one or more words;
converts each of the one or more words in each sentence into a word vector using a word embedding model;
trains each of the plurality of message classification models, using the word vectors from each sentence in the message as input, to generate a complaint prediction value for the message;
determines whether the complaint prediction value for the message classifies the message as a complaint; and
adjusts one or more of the plurality of message classification models when the complaint prediction value for the message does not classify the message as a complaint.

3. The system of claim 1, wherein filtering the corpus of unstructured computer text using natural language processing comprises:
identifying one or more complaint-specific keywords;
determining whether one or more of the complaint-specific keywords is located in the corpus of unstructured computer text; and
capturing each message in the corpus of unstructured computer text that contains at least one of the complaint-specific keywords.

4. The system of claim 1, wherein the server computing device parses the unstructured computer text into one or more sentences by locating a terminator in the unstructured computer text and separating the unstructured computer text on one side of the terminator into a sentence.

5. The system of claim 1, wherein combining the complaint probability values from each of the plurality of message classification models into an overall complaint probability value for the message comprises:
receiving, by an ensemble classifier on the server computing device, the complaint probability value for the message from each of the plurality of message classification models; and
aggregating, by the ensemble classifier, the complaint probability value from each of the plurality of message classification models to generate the overall complaint probability value for the message.

6. The system of claim 1, wherein each word vector comprises a plurality of numeric values corresponding to one or more of a context or a meaning of the word.

7. The system of claim 1, wherein routing the identified message to a second client computing device comprises:
capturing metadata associated with the identified message;
assigning at least a portion of the metadata as the one or more context features of the identified message;
identifying a destination address associated with the second client computing device based upon the one or more context features; and
transmitting the identified message and the one or more context features to the second client computing device using the destination address.

8. The system of claim 7, wherein the second client computing device selects the archive to store the identified message based upon the one or more context features.

9. The system of claim 8, wherein the one or more messages comprise email messages.

10. The system of claim 9, wherein the one or more context features comprises an origination address, a destination address, a date, a timestamp, a subject line, an email host address, and a policy value.

11. A computerized method in which unstructured computer text is analyzed for identification and classification of complaint-specific user interactions, the method comprising:
receiving, at a computer data store, a corpus of unstructured computer text comprising a plurality of messages corresponding to current user interactions, the unstructured computer text being input via an application running on a first client computing device, input directly into the computer data store via a first computer file, or any combination thereof;
filtering, by a server computing device in communication with the computer data store, the corpus of unstructured computer text using natural language processing to identify one or more messages of the plurality of messages that comprise a potential complaint;
for each identified message:
parsing, by the server computing device, the message into a plurality of sentences with one or more words;
converting, by the server computing device, each of the one or more words in each sentence into a word vector using a word embedding model;
executing, by the server computing device, each of a plurality of message classification models using the word vectors from each sentence in the message as input to generate a complaint probability value for the message, each message classification model comprising a multilayer neural network that is configured to have weight values different from the other message classification models according to a different aspect of the message, wherein the aspect of the message comprises one of message word choice, message context, or message metadata, and
wherein each message classification model comprises:
a plurality of encoder layers, each encoder layer comprising a bi-directional long short-term memory layer and an encoder self-attention layer that processes a different portion of the word vectors from the message,
a model self-attention layer that receives word vectors from each of the plurality of encoder layers to determine relationships of each word vector from a portion of the message to other word vectors in the portion of the message, and a feed forward layer that receives word vectors from the model self-attention layer to generate the complaint probability value for the message based upon the weight value assigned to the model;

combining, by the server computing device, the complaint probability values from each of the plurality of message classification models into an overall complaint probability value for the message;

classifying, by the server computing device, the message as a complaint when the overall complaint value exceeds a predetermined threshold value; and for each identified message classified as a complaint, routing, by the server computing device, the identified message to a second client computing device, wherein the second client computing device categorizes the identified message based upon one or more context features of the message and stores the message in an archive.

12. The method of claim 11, further comprising:

receiving, by the server computing device, a second corpus of unstructured computer text comprising a plurality of messages, the second corpus of unstructured computer text corresponding to prior user complaints;

for each message in the second corpus of unstructured computer text:

parsing, by the server computing device, the message into a plurality of sentences with one or more words;

converting, by the server computing device, each of the one or more words in each sentence into a word vector using a word embedding model;

training, by the server computing device, each of the plurality of message classification models, using the word vectors from each sentence in the message as input, to generate a complaint prediction value for the message;

determining, by the server computing device, whether the complaint prediction value for the message classifies the message as a complaint; and adjusting, by the server computing device, one or more of the plurality of message classification models when the complaint prediction value for the message does not classify the message as a complaint.

13. The method of claim 11, wherein filtering the corpus of unstructured computer text using natural language processing comprises:

identifying one or more complaint-specific keywords;

determining whether one or more of the complaint-specific keywords is located in the corpus of unstructured computer text; and capturing each message in the corpus of unstructured computer text that contains at least one of the complaint-specific keywords.

14. The method of claim 11, further comprising parsing, by the server computing device, the unstructured computer text into one or more sentences by locating a terminator in the unstructured computer text and separating the unstructured computer text on one side of the terminator into a sentence.

15. The method of claim 11, wherein combining the complaint probability values from each of the plurality of message classification models into an overall complaint probability value for the message comprises:

receiving, by an ensemble classifier on the server computing device, the complaint probability value for the message from each of the plurality of message classification models; and aggregating, by the ensemble classifier, the complaint probability value from each of the plurality of message classification models to generate the overall complaint probability value for the message.

16. The method of claim 11, wherein each word vector comprises a plurality of numeric values corresponding to one or more of a context or a meaning of the word.

17. The method of claim 11, wherein routing the identified message to a second client computing device comprises:

capturing metadata associated with the identified message;

assigning at least a portion of the metadata as the one or more context features of the identified message;

identifying a destination address associated with the second client computing device based upon the one or more context features; and transmitting the identified message and the one or more context features to the second client computing device using the destination address.

18. The method of claim 17, wherein the second client computing device selects the archive to store the identified message based upon the one or more context features.

19. The method of claim 18, wherein the one or more messages comprise email messages.

20. The method of claim 19, wherein the one or more context features comprises an origination address, a destination address, a date, a timestamp, a subject line, an email host address, and a policy value.

* * * * *